United States Patent
Cheriton (10) Patent No.: US 7,092,399 B1
(45) Date of Patent: Aug. 15, 2006

(54) REDIRECTING MULTIPLE REQUESTS RECEIVED OVER A CONNECTION TO MULTIPLE SERVERS AND MERGING THE RESPONSES OVER THE CONNECTION

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 935 days.

(21) Appl. No.: 09/981,170

(22) Filed: Oct. 16, 2001

(51) Int. Cl.
*H04L 12/28* (2006.01)

(52) U.S. Cl. .................... 370/401; 709/203; 718/105

(58) Field of Classification Search .................... None
See application file for complete search history.

(56) References Cited

U.S. PATENT DOCUMENTS

| | | | |
|---|---|---|---|
| 5,793,763 A | 8/1998 | Mayes et al. | |
| 6,061,349 A | 5/2000 | Coile et al. | |
| 6,104,717 A | 8/2000 | Coile et al. | |
| 6,240,461 B1 | 5/2001 | Cieslak et al. | |
| 6,259,705 B1* | 7/2001 | Takahashi et al. | 370/465 |
| 6,263,368 B1* | 7/2001 | Martin | 709/224 |
| 6,298,063 B1 | 10/2001 | Coile et al. | |
| 6,601,084 B1* | 7/2003 | Bhaskaran et al. | 718/105 |
| 6,779,017 B1* | 8/2004 | Lamberton et al. | 709/203 |
| 2002/0012319 A1* | 1/2002 | Rochberger et al. | 370/229 |
| 2002/0120743 A1* | 8/2002 | Shabtay et al. | 709/226 |
| 2002/0152307 A1* | 10/2002 | Doyle et al. | 709/225 |
| 2003/0023744 A1* | 1/2003 | Sadot et al. | 709/234 |
| 2003/0033428 A1* | 2/2003 | Yadav | 709/238 |
| 2003/0074467 A1* | 4/2003 | Oblak et al. | 709/238 |

* cited by examiner

*Primary Examiner*—Bob A. Phunkulh
(74) *Attorney, Agent, or Firm*—The Law Office of Kirk D. Williams (57) ABSTRACT

Methods and apparatus are disclosed for redirecting requests received over a connection and redirecting them to multiple servers. The responses are then merged and sent over the connection. In this manner, Transmission Control Protocol (TCP) and other transport layer connections can be redirected to different servers on a per-request basis while still allowing client requests to be pipelined. In one implementation, a splicer device or process of a switch is used to map the requests to the appropriate servers and responses back over the appropriate connection. A set of connections may be pre-established between the switch and the servers. The splicer device or process maintains a data structure indicating the usage of these connections. The splicer device or process may maintain counts and/or receives indications from a server when a response has been completed, to identify when a connection may be used for servicing another request and/or connection.

21 Claims, 7 Drawing Sheets

REDIRECTING MULTIPLE REQUESTS RECEIVED OVER A CONNECTION TO MULTIPLE SERVERS AND MERGING THE RESPONSES OVER THE CONNECTION

FIELD OF THE INVENTION

This invention relates to communications systems, and in particular routers and packets switching systems; and more particularly, the invention relates to redirecting multiple requests received over a connection (e.g., TCP) to multiple servers and merging the responses over the connection.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

It is increasingly common with an Internet service for a client to issue multiple service requests over a transport (e.g., Transmission Control Protocol a.k.a. "TCP") connection. For example, with HTTP 1.1 persistent connections, multiple HTTP requests can be made over a single (persistent) connection. Similarly, with NFS over TCP, multiple read, write, etc. operations are typically performed over the same connection, given that the connection is established at the time the server is "mounted" and remains until it has been unmounted or a significant failure occurs. A similar behavior arises with CIFS connections.

It is also common to implement scalable services as a cluster of physical servers connected to the Internet or an intranet through a load-balancing switch appearing on the Internet as a single virtual host. From the client's perspective, its transport level connection is with this virtual host. It is oblivious to the multiple physical servers.

In this configuration, if a client's request is simply directed to a particular physical server based on load or randomly, each physical server needs to either have a local copy of all the content the client can request or needs to communicate with the "home" server for the content. With a non-trivial cluster of k servers, fully replicating the content is impractical in general and raises issues and cost of maintaining coherency, Also, if each server communicates with a home server for the content, statistically most of the client requests would involve this extra server-to-server communication, limiting the benefits of the cluster architecture. With a large cluster, the benefits of a load-sensitive approach may be limited because real hotspots are unlikely with many physical servers.

Another approach is to have a set of backend servers that are shared among all the "front-end" servers. However, this introduces an extra level of server machines and their associated cost, and also leads to coherency issues if the front-end machines cache data, and limited performance if they do not.

An alternative configuration is for the load-balancing switch to scan each client request and redirect the client connection transparently to the appropriate server holding this content. For example, a content switch typically uses network address translation (NAT) to translate the client packets on its apparent connection to the service virtual host to a selected physical server. Changing this mapping each time, a new client request asks for content that is homed on a different physical server. However, this implementation relies on a client receiving the response from one request before issuing the next request, and allowing the switch to know when to redirect the return flow from the server to the client to the next physical server. If the client pipelines its requests, the switch must somehow detect the end of one response and splice in the return flow from the next server, potentially well after several clients requests have been forwarded on to different servers for response.

Needed are new systems and methods to allow pipelined client requests while switching the requests to the server most appropriate to handle each request.

SUMMARY OF THE INVENTION

Systems and methods are disclosed for redirecting multiple requests received over a single connection to multiple servers and merging the responses over the single connection. One embodiment includes a switch, router, or other communications or computer device. One embodiment includes a memory for storing connection information. A server address translator is configured to receive multiple requests from a client over a single connection, to reference the memory to determine multiple servers to service the received multiple requests; and to redirect the received multiple requests to the determined multiple servers. A client address translator is configured to receive multiple responses from the determined multiple servers; to organize the received multiple responses into a stream of packets; and to forward the stream of packets over the connection to the client.

In one embodiment, the server address translator is further configured to send multiple splicer tokens to the determined multiple servers, and the client address translator is further configured to receive multiple splicer token responses; and to update the memory in response to the receipt of the multiple splicer token responses.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for redirecting multiple requests received over a single connection to multiple servers and merging the responses over the single connection, which may be used, inter alia, in a computer or communications system, such as a computer or communications device, packet switching system, router, other device, or component thereof. Such methods and apparatus are not limited to a single computer or communications system. Rather, the architecture and functionality taught herein are extensible to an unlimited number of computer and communications systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, integrated circuit chips, embedded processors, ASICs, methods, and computer-readable medium containing instructions. The embodiments described hereinafter embody various aspects and configurations within the scope and spirit of the invention.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps and processing of signals and information illustrated in the figures are typically be performed in a different serial or parallel ordering and/or by different components in various embodiments in keeping within the scope and spirit of the invention. Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information.

According to one aspect of the invention, multiple requests are received over a connection and redirected to multiple servers. The responses are then merged and sent over the connection.

In one embodiment, a set of connections are pre-established between the switch and each of the servers. Although not required, pre-establishment of these connections typically makes an embodiment operationally faster. For example, a load-balancing switch in one embodiment maintains a queue of free connections per physical server and a directory of in-use such connections. Each directory entry specifies the associated client connection information, including a queue of server connections that are to serve this client connection. In one embodiment, a descriptor per server connection is stored in a server connection table, and the free and in-use queues contain indexes to the descriptors corresponding to these connections.

In one embodiment, a "splicer" device performs address and/or sequence number translation on packets received over a connection and merges the responses back to the client over the connection. The splicer device may be integrated into a switch or router, or may be a standalone device. A "splice" token is used in one embodiment for packets received which causes the splicer device to switch the return path connection between the switch and a server to a connection from the next responding server, with the splicer detecting packets corresponding to an earlier splice based on the packet sequence number.

For example, a client seeking service from the virtual host server (e.g., a collection of servers) establishes a client TCP connection to the switch. The switch monitors the client request stream. On each request, it typically redirects the request to the physical server handling that request, typically based on the requested content (e.g., type of data, location of requested information, traffic load, etc.) On each such redirection to a new physical server, the switch typically takes action to ensure that a recognizable "splice token" is returned by the current server after this server responds to the previous request. For example, in one embodiment, the switch inserts a special request into the connection to this previous server, which causes it to respond over its connection with a special non-standard response packet that acts as this token. In one embodiment, the switch uses a request within the conventional protocol that should not otherwise occur. For example, the switch may insert an illegal operation code in the request. In one embodiment, the server ideally returns the splice token as a separate packet, allowing the switch to more easily detect this token, although this is not required.

In handling this redirection to a new server, the switch typically also adds a reference to a transport connection to this next server into the client-specific queue of such connections. The request that prompted the redirection is forwarded on to the new server over the allocated connection to that server. In other words, the request is forwarded in a packet with addresses and sequence number appropriate for this server connection.

On receipt of the splice token, the switch typically frees the current server connection back to the pool of free server connections, changes the translation of sequence numbers to adapt to the new connection, sets the return sequence number barrier to that of the new server connection, and is then ready to receive a response from the next selected server or connection.

In one embodiment, a splice token is in the form of an indication returned by the server, such as, but not limited to an end-of-response indication on each response and having the splicer maintain a count of responses required before switching to the next server connection. For example, this count is decremented for each response received, and the next connection is then used when it reaches zero.

In one embodiment, the server is caused to close the server connection at the end of each request or the end of a last request, so that the connection close serves as the effective token. For example, the switch may signal a close on the connection at the end of the last request. Alternatively, the server may close the connection in response to some inserted request. In this case, the switch typically ensures that the client received and acknowledged all the data before allowing the connection close to complete.

In one embodiment, the switch performs this translation with packets being retransmitted in both the forward (client to server) and reverse (server to client) directions. In one embodiment, the switch supports connection flow/forwarding based on sequence number range as well as an address. For example, the switch, in one embodiment, has a set of k translation parameters per client flow, each associated with a sequence number range. A packet is forwarded and translated according to its sequence number range. Thus, when a request is redirected to server j that is different from server i that handled the previous request, the sequence number range for i is limited to that of the last request, and packets with later sequence number ranges are forwarded according to the redirection to server j. In one embodiment, the hardware directory specifies a single sequence number as the barrier between the new and old servers, and advances that barrier as packets are transmitted. In this case, a retransmission, typically detected as a packet with a sequence number less than this barrier, is forwarded to software to handle, providing in software the effective k or more entries. On the reverse path, the same mechanism typically is used, with retransmitted packets from the server being trapped by sequence number to be redirected to a previous client connection.

In one embodiment, the match-splicer applies filters to catch resets and closes of the connections that should not be passed on to the client or the server, depending on the direction.

In one embodiment, such as, but not limited to that of a high-speed switch, the return path processing is implemented entirely in hardware except possibly for the handling of retransmitted packets, which may be passed to software. Given that typical file and web servers typically transmit six to ten times the bytes to the client as the client sends to the servers, this structure provides maximum performance gain over a pure software implementation with minimal hardware complexity.

Figure 1:
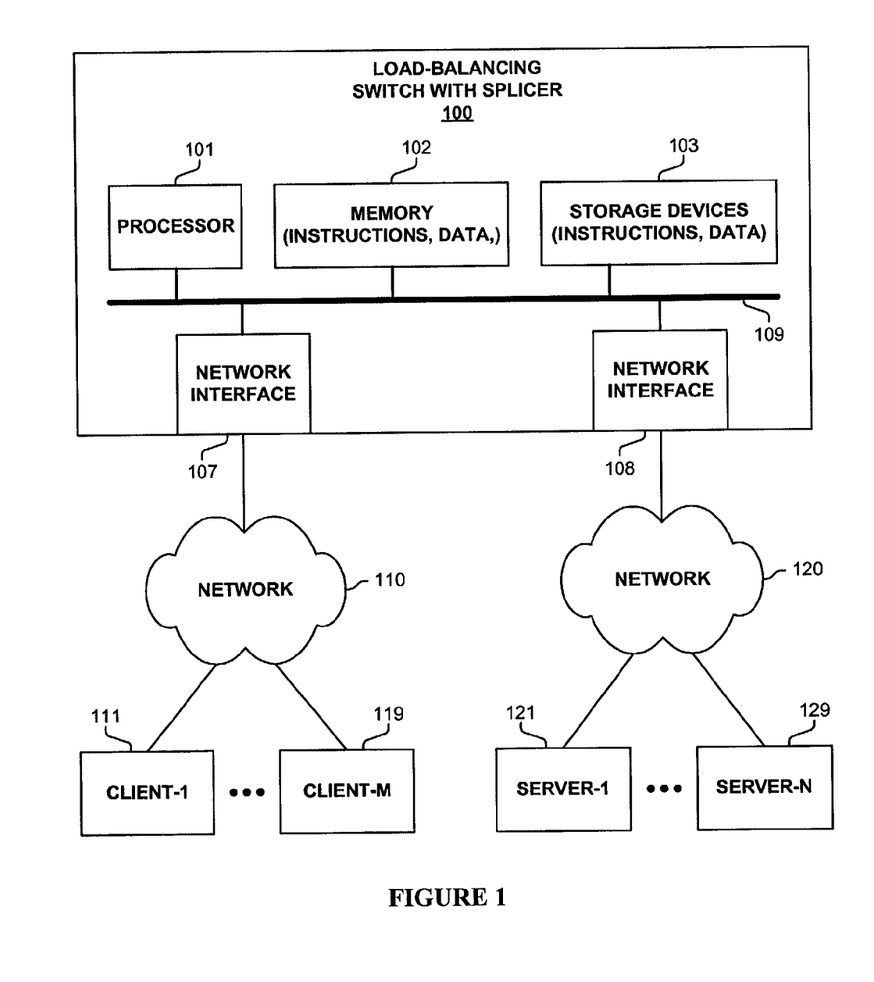
FIG. 1 is a block diagram illustrating one embodiment including a load-balancing switch with a splicer, and multiple clients and servers.

FIG. 1 illustrates one embodiment of a system 100 for redirecting multiple requests received from multiple clients 111–119 over a single connection (e.g., TCP) through network 110 to multiple servers 121–129 through network 120, and for merging the responses over the single connection. As shown, load-balancing switch with splicer 100 comprises a processor 101, memory 102, storage devices 103, and network interfaces 107–108, which are electrically coupled via one or more communications mechanisms 109 (shown as a bus for illustrative purposes). The operation of system 100 is typically controlled by processor 101 using memory 102 and storage devices 103. System 100 communicates, using network interface 107, over network 110, to multiple clients 111–119. System 100 also communicates, using network interface 108, over network 120 to multiple servers 121–129.

Memory 102 is one type of computer-readable medium, and typically comprises random access memory (RAM), read only memory (ROM), integrated circuits, and/or other memory components. Memory 102 typically stores computer-executable instructions to be executed by processor 101 and/or data which is manipulated by processor 101 for implementing functionality to redirect multiple requests received over a single connection to multiple servers and to merge the responses over the single connection in accordance with the invention. Storage devices 103 are another type of computer-readable medium, and typically comprise disk drives, diskettes, networked services, tape drives, and other storage devices. Storage devices 103 typically store computer-executable instructions to be executed by processor 101 and/or data which is manipulated by processor 101 for implementing functionality to redirect multiple requests received over a single connection to multiple servers and to merge the responses over the single connection in accordance with the invention.

As used herein and contemplated by the invention, computer-readable medium is an extensible term, including not limited to, memory and storage devices and other storage mechanisms.

Figure 2:
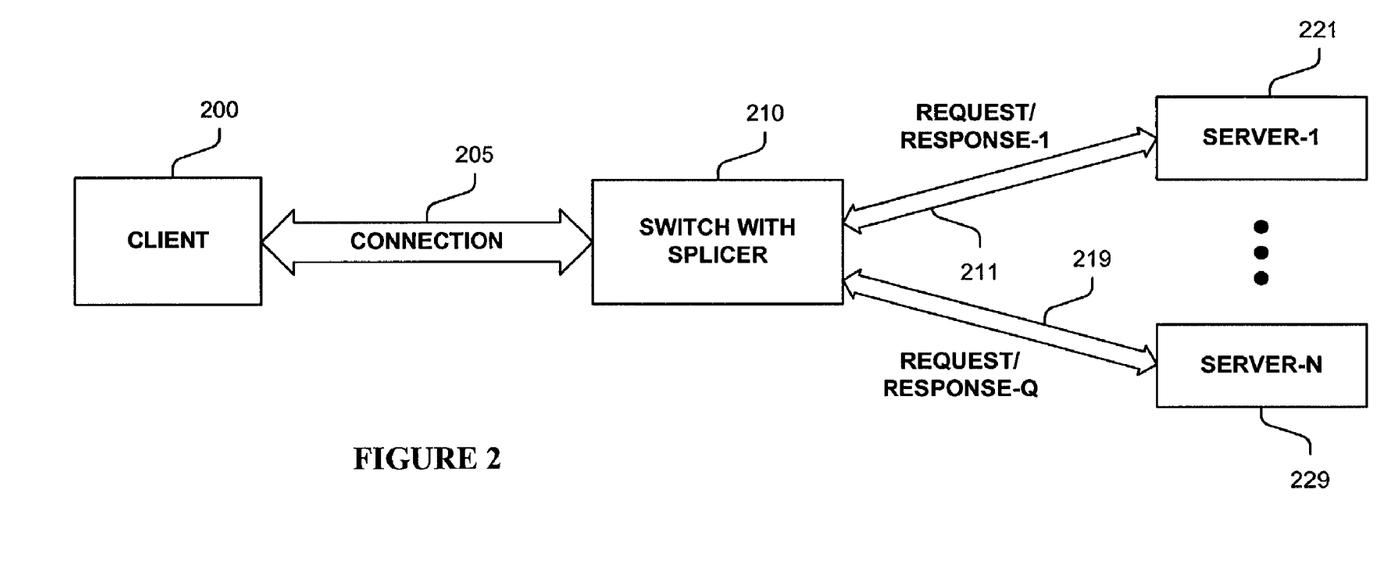
FIG. 2. is a block diagram illustrating the operation of one embodiment.

FIG. 2 illustrates a logical flow of one embodiment for redirecting multiple requests received over a single connection to multiple servers and for merging the responses over the single connection. Client 200 sends multiple requests over connection 205. For example, connection 205 could be a TCP connection, and the requests could correspond to image, data and other requests for presenting and processing a web page.

Switch with splicer 210 receives the multiple requests from client 200, and forwards the requests to, and receives responses from multiple servers 221–229 over connections 211–219. Switch with splicer 210 may distribute the requests to servers 221–229 based on an extensible set of criteria, including, but not limited to the location of the data and traffic load conditions. Servers 221–229 provide responses to the requests, and switch with splicer 210 splices the responses back into a single stream of packets over connection 205 to client 200. In one embodiment, switch with splicer 210 further sends a splicer indication or token after each request to the particular server receiving the request, and receives a splicer response back from the particular one of the servers 221–229. The splicer response provides an indication to switch with splicer 210 that a particular request has been completed, which allows switch with splicer 210 to take appropriate action, including, but not limited to freeing up resources or indications of used resources in one or more data structures.

Figure 3A:
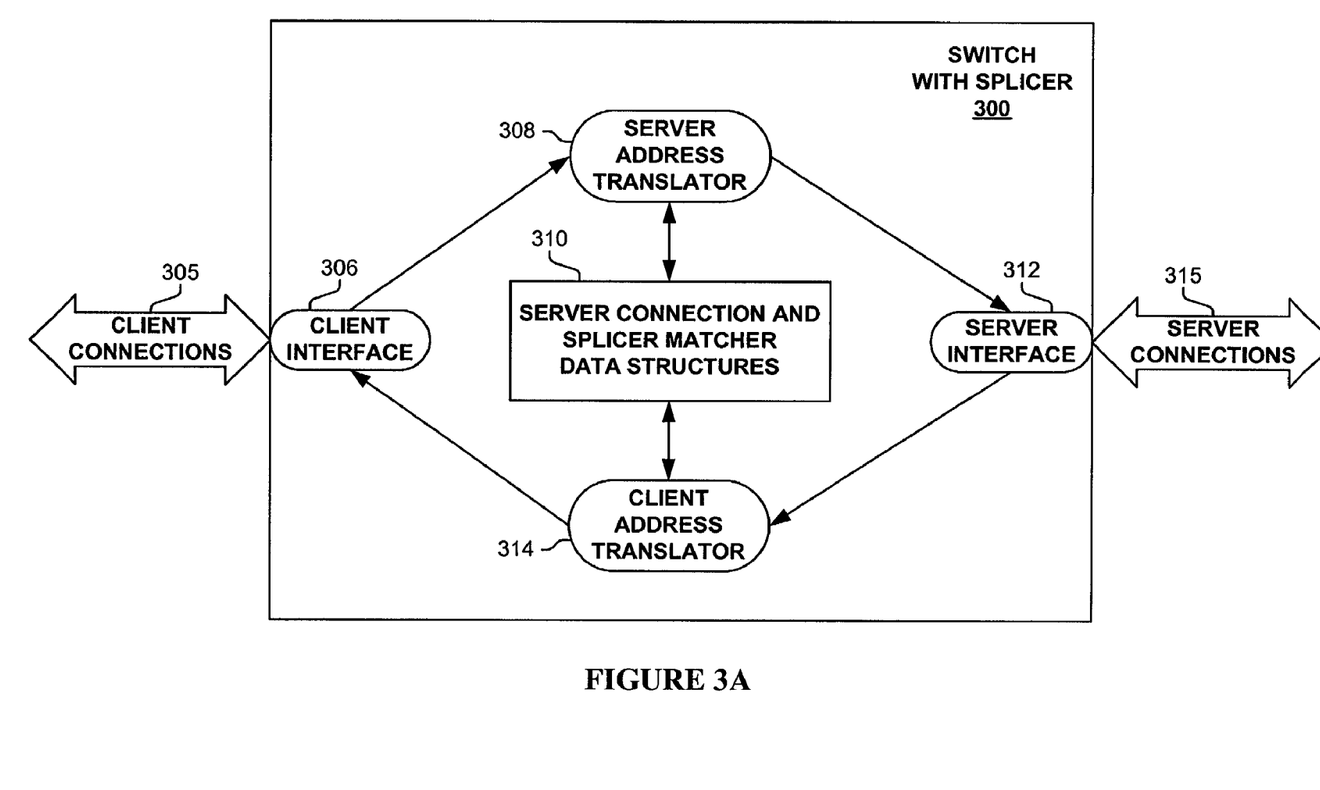
FIG. 3A is a block diagram of one embodiment of a switch with splicing capabilities.

FIG. 3A presents one of an unlimited number of embodiments of a switch with splicer 300 in accordance with the invention. As shown, switch with splicer 300 receives requests over client connections 305 on client interfaces 306. A server address translator 308 references one or more data structures 310 (e.g., server connection and splicer matcher data structures) to determine to which server to forward a particular request. Server address translator 308 typically selects a server based on some criteria, and updates one or more data structures 310 to indicate the selection, and possible to indicate that a pre-existing server connections 315 to one of the servers is being allocated to service the particular request. The particular request is forwarded by server interface 312 over one of the established server connections 315, establishes a new connection, or via some other method. In one embodiment, a splicer token is also sent over the selected server connection 315. This process is repeated for multiple requests from the same clients, as well as for multiple clients.

Server interface 312 of switch with splicer 300 receives the responses over server connections 315 (or via some other mechanism). Client address translator 314 redirects the response by typically performing a network address translation and possibly modifying or adding a sequence number corresponding to that of the particular one of the client connections 305, such that a client can receive responses from its multiple requests over a single logical connection (e.g., TCP connection). Client interface 306 forwards the packets to the clients. In one embodiment, client address translator 314 further receives indications of splicer responses, and updates one or more data structures 310.

Figure 3B:
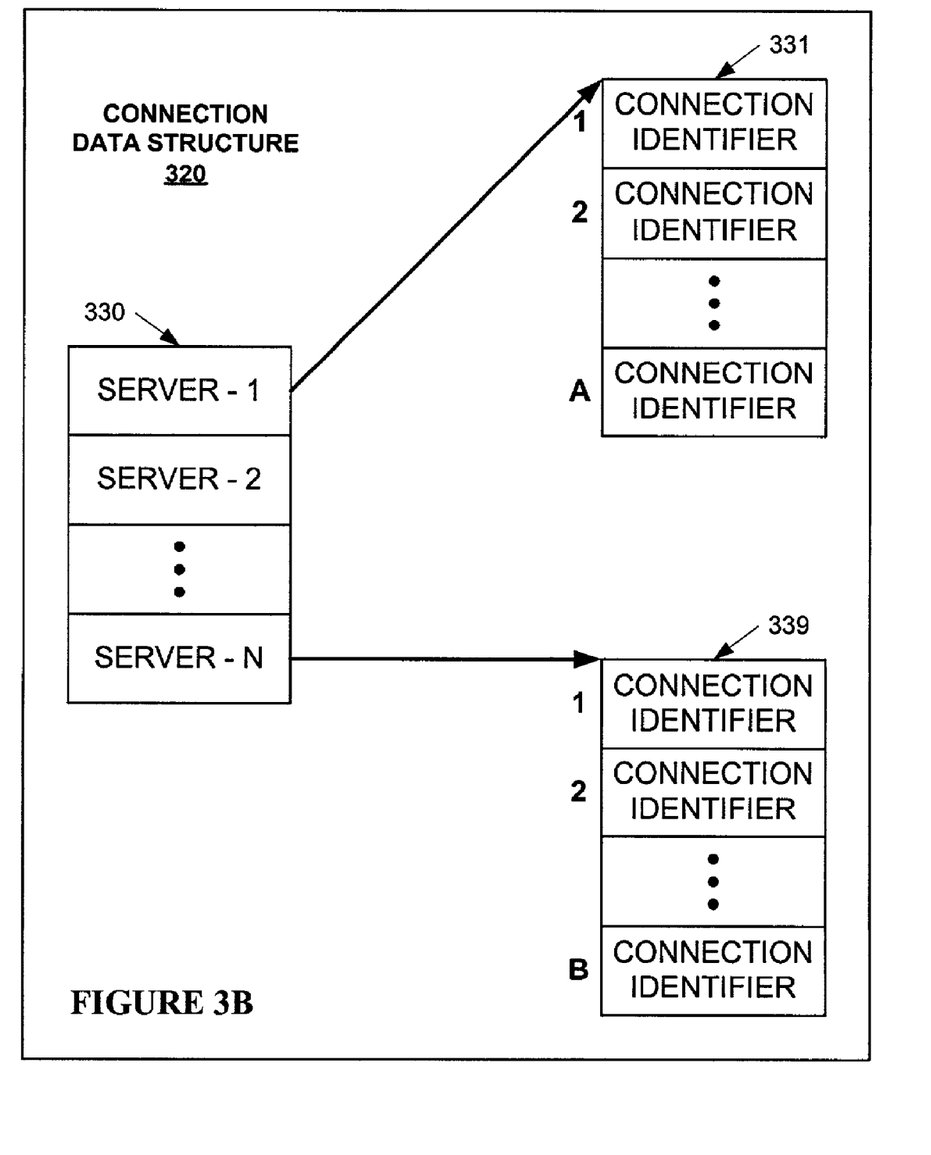
FIGS. 3B–C are block diagrams of exemplary data structures used in some embodiments.

FIG. 3B illustrates one embodiment of a connection data structure 320 used in one embodiment to maintain a set of pre-established connections to servers. In one embodiment, connection data structure 320 is in the form of an array 330 with an entry for each of the n servers, with a linked list pointer to arrays of connection identifiers 331–339 which indicate available connections to a particular server.

Figure 3C:
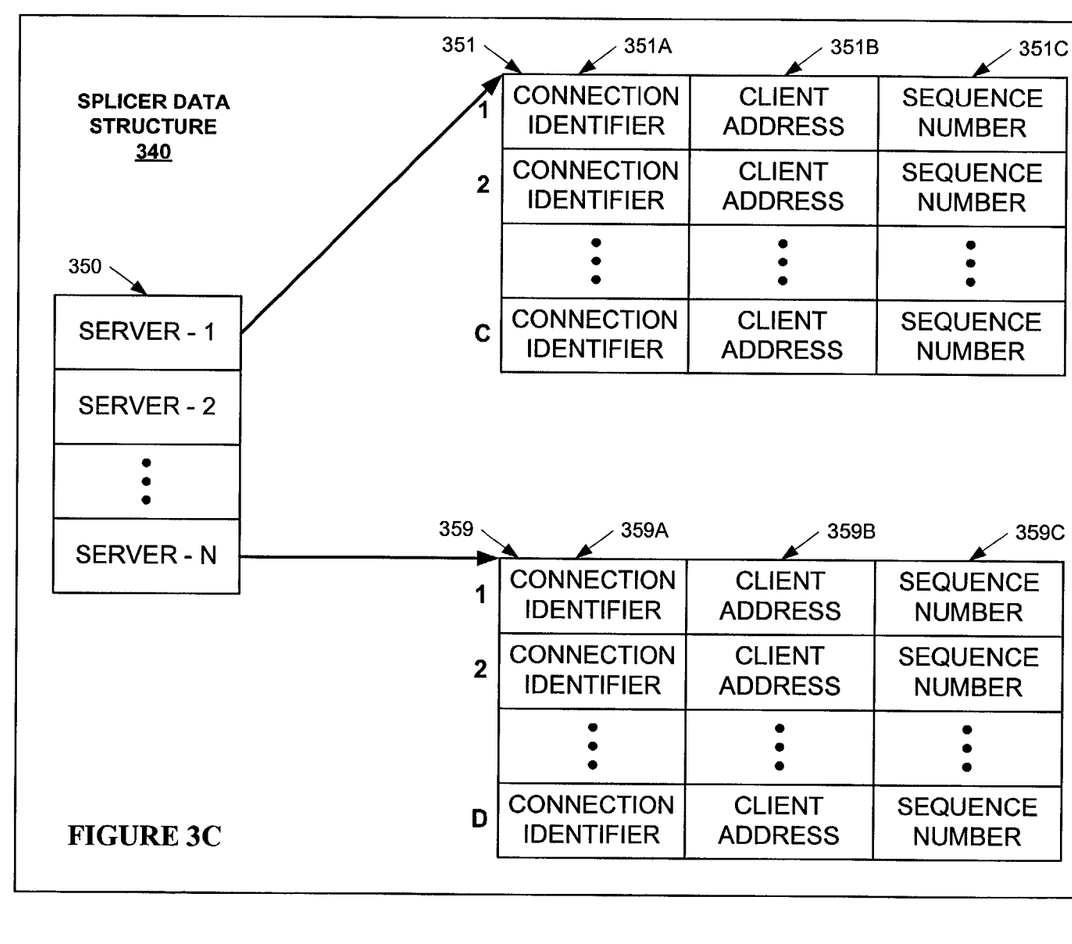

FIG. 3C illustrates one embodiment of a splicer data structure 340 used in one embodiment to maintain information about outstanding requests sent to a server. In one embodiment, splicer data structure 340 is in the form of an array 350 with an entry for each of the available servers, with a linked list entry to an array 351–359 of information of outstanding requests and client connections. In one embodiment, a connection identifier 351A–359A is maintained for a server connection being used, along with a corresponding client address 351B–359B, and a sequence number 351C–359C for use in splicing and sending multiple responses over a single connection to each of the clients.

Figure 4A:
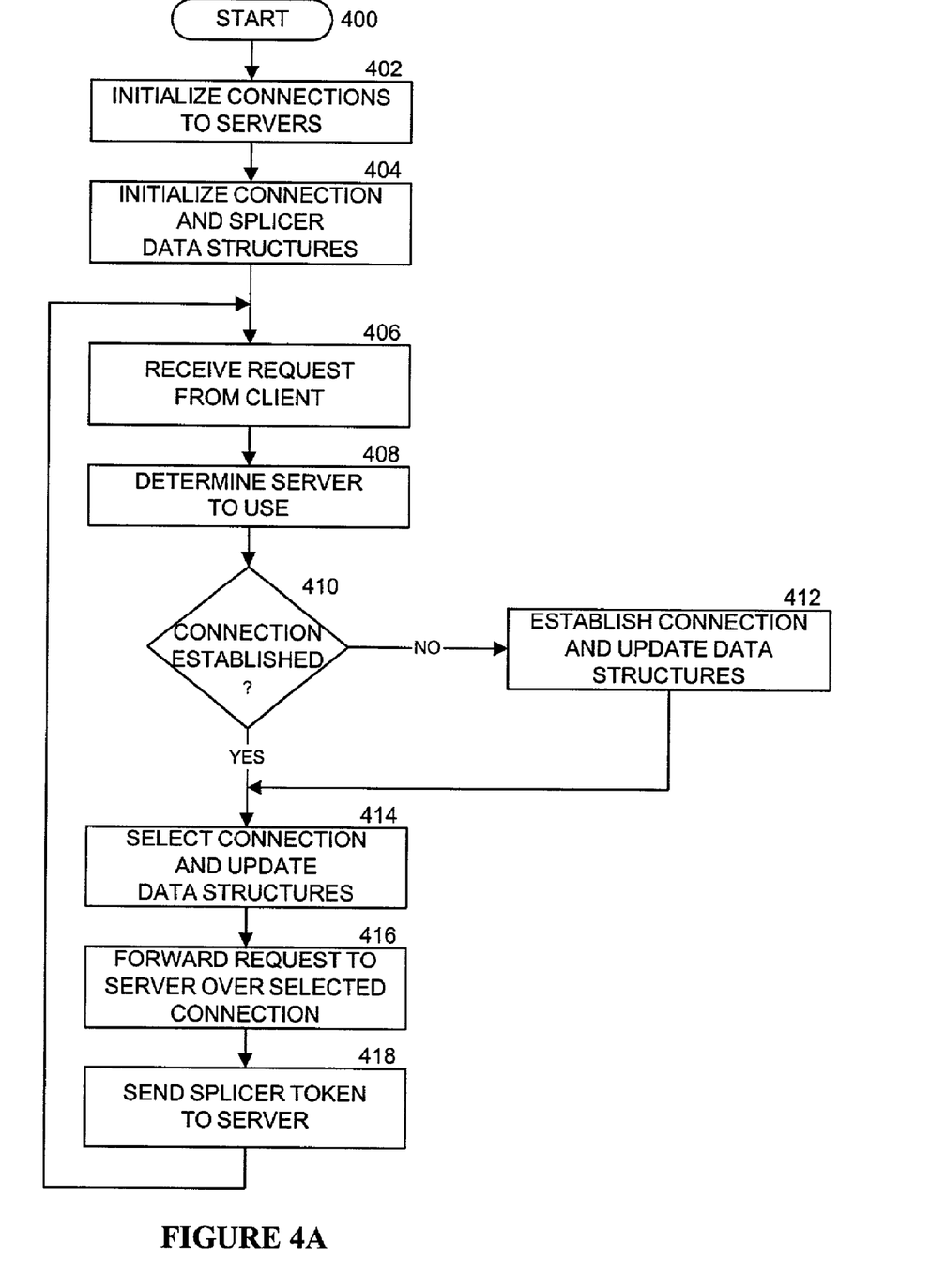
FIGS. 4A–B are flow diagrams of exemplary processes used in one embodiment for redirecting multiple requests received over a single connection to multiple servers and merging the responses over the single connection.

The processing by one embodiment is further explained in relation to the flow diagram of FIG. 4A. Processing begins at process block 400, and proceeds to process block 402, wherein a set of connections are pre-established to a bank of servers. Next, in process block 404, the connection and splicer data structures are initialized to indicated the establishment of these connections and other housekeeping data.

A request is received from a client in process block 406, and a server to which to respond to the request is determined in process block 408. If, as determined in process block 410, that a connection is not established to the determined server, then in process block 412, one or more connections are established to the server, and one or more data structures are updated to reflect the new connection or connections. Next, in process block 414, a particular connection to the determined server to use is selected and the one or more data structures are updated. In process block 416, the request is forwarded over the selected connection; and in process block 418, a splicer token is sent to the determined server over the selected connection. Processing returns to process block 406 to process more client requests.

Figure 4B:
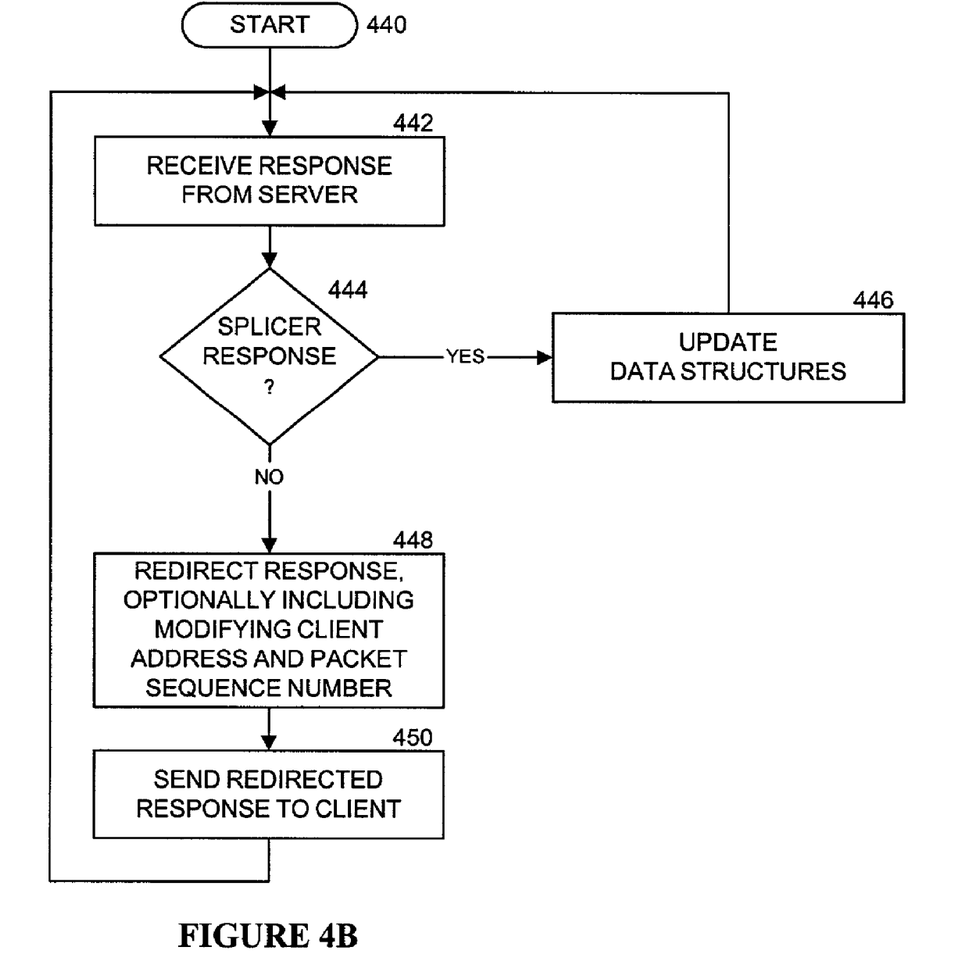

The processing of one embodiment is further explained in relation to the flow diagram of FIG. 4B. Processing begins at process block 440, and proceeds to process block 442, wherein a response is received from a server. Next, as determined in process block 444, if the response is a splicer token response, then in process block 446, the one or more data structures are updated in process block 446, such as, but not limited to indicating that the connection to the responding server is no longer in use. Otherwise, in process block 448, the response is redirected to the originating client over the single connection. In one embodiment, the data portion of the response is included in one more packets with new a header information indicating the address of the client and/or an appropriate sequence number or numbers for the single connection the client. In process block 450, the redirected response is sent to the client over the single connection. Processing returns to process block 442 to receive and process more server responses.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

The invention claimed is:

1. A switch comprising:
   a memory configured to store connection information;
   a server address translator configured to receive a plurality of requests from a client over a single connection, to reference the memory to determine a plurality of servers to service said received plurality of requests; and to redirect said received plurality of requests to said determined plurality of servers; wherein the server address translator is configured to indicate a splice token request to a current server of said determined plurality of servers in response to a redirection of said requests from the client to a server different from the current server of said determined plurality of servers; and
   a client address translator configured to receive a plurality of responses, including a plurality of splice token responses to said splice token requests, from said determined plurality of servers; to organize said received plurality of responses into a stream of packets; and to forward said stream of packets over the connection to the client; wherein the client address translator is configured update the memory in response to said splice token response in order to identify whether or not to switch to a different server than a current server of said determined servers for said responses.

2. The switch of claim 1, wherein said each of said splice token responses is sent in a packet separate from said response(s) received from the current server which said splice token response corresponds.

3. A method comprising:
   receiving a plurality of requests from a client over a single Transmission Control Protocol (TCP) connection;
   redirecting the plurality of requests to a plurality of servers;
   receiving a plurality of responses from the plurality of servers;
   organizing the plurality of the responses into a stream of packets;
   sending the stream of packets to the client over the single connection;
   sending a plurality of indications to the plurality of servers;

receiving a plurality of splice indication responses from the plurality of servers; and wherein said organizing the plurality of the responses includes referencing the plurality of splice indication responses.

4. The method of claim 3, further comprising updating the memory or a second memory in response to receiving the plurality of splice indication responses.

5. The method of claim 3, wherein said each of said splice token responses is received in a packet separate from said response(s) received from the server of said plurality of servers which said splice token response corresponds.

6. A method comprising:

receiving a first request over a connection from a client;

redirecting the first request to a first server;

receiving a first response to the first request from the first server;

forwarding the first response over the connection to the client;

receiving a second request over the connection from the client after said redirecting the first request to the first server;

in response to identifying that the second request should be sent to a second server different from the first server, sending a first splice token to the first server to indicate the redirection of requests from the client;

redirecting the second request to the second server;

receiving a second response to the second request from the second server; and forwarding the second response over the connection to the client.

7. The method of claim 6, further comprising: comprising receiving a first splice token response from the first server.

8. The method of claim 7, further comprising updating a memory for storing splicer data in response to said receiving the first splice token response in order to identify whether or not to switch to the second server for the second response.

9. The method of claim 8, wherein the splicer data indicates an address of the client.

10. The method of claim 8, wherein the splicer data indicates a sequence number for a set of packets received from the client.

11. The method of claim 6, further comprising selecting the first server from a set of server identifiers maintained in a memory configured to store connection information.

12. The method of claim 6, wherein the second request is received prior to receiving and forwarding the first response to the client.

13. A method comprising:

establishing a set of connections to a plurality of servers;

maintaining an indication of the set of connections;

receiving a first request over a Transmission Control Protocol (TCP) connection from a client;

referencing the indication to determine a first one of the plurality of servers;

redirecting the first request to the first one of the plurality of servers;

receiving a first response to the first request from the first one of the plurality of servers;

receiving a second request over the connection from the client after said redirecting the first request to the first one of the plurality of servers;

referencing the indication to determine a second one of the plurality of servers;

sending a splice token request to the first one of the plurality of servers after redirecting the first request to the first one of the plurality of servers, and in response to said determination of the second one of the plurality of servers;

redirecting the second request to the second one of the plurality of servers;

in response to receiving a splice token response based on the splice token request from the first one of the plurality of servers updating the indication in response to receiving the splice token response to identify to receive responses from the second one of the plurality of servers;

receiving a second response to the second request from the second one of the plurality of servers; and organizing the first and second responses into a stream of packets.

14. An apparatus comprising:

means for receiving a plurality of requests from a client over a single connection;

means for redirecting the plurality of requests to a plurality of servers;

means for receiving a plurality of responses from the plurality of servers;

means for organizing the plurality of the responses into a stream of packets;

means for sending the stream of packets to the client over the single connection;

means for sending a plurality of splice indications to the plurality of servers;

means for receiving a plurality of splice token responses from the plurality of servers; and wherein said means for organizing the plurality of the responses includes means for referencing the plurality of splice token responses.

15. One or more computer-readable media containing computer-executable instructions for performing operations comprising:

receiving a first request over a connection from a client;

redirecting the first request to a first server;

receiving a first response to the first request from the first server;

forwarding the first response over the connection to the client;

receiving a second request over the connection from the client after said redirecting the first request to the first server;

in response to identifying that the second request should be sent to a second server different from the first server, sending a first splice token to the first server to indicate the redirection of requests from the client;

redirecting the second request to the second server;

receiving a second response to the second request from the second server; and forwarding the second response over the connection to the client.

16. The computer-readable media of claim 15, wherein said operations further comprise receiving a first splice token response from the first server.

17. The computer-readable media of claim 16, wherein said operations further comprise updating a memory for storing splicer data in response to said receiving the first splice token response in order to identify whether or not to switch to the second server for the second response.

18. The computer-readable media of claim 17, wherein the splicer data indicates an address of the client.

19. The computer-readable media of claim 17, wherein the splicer data indicates a sequence number for a set of packets received from the client.

20. The computer-readable media of claim 15, wherein said operations further comprise selecting the first server from a set of server identifiers maintained in a memory configured to store connection information.

21. The computer-readable media of claim 15, wherein the second request is received prior to receiving and forwarding the first response to the client.

* * * * *

UNITED STATES PATENT AND TRADEMARK OFFICE
CERTIFICATE OF CORRECTION

| | | |
|---|---|---|
| PATENT NO. | : 7,092,399 B1 | Page 1 of 1 |
| APPLICATION NO. | : 09/981170 | |
| DATED | : August 15, 2006 | |
| INVENTOR(S) | : David Cheriton | |

It is certified that error appears in the above-identified patent and that said Letters Patent is hereby corrected as shown below:

Col. 8, line 25, replace "The invention claimed" with -- What is claimed --

Col. 8, line 66, replace "plurality of indications" with -- plurality of splice indications --

Col. 10, line 13, replace "servers updating" with -- servers, updating --

Signed and Sealed this

Fifth Day of December, 2006

JON W. DUDAS
*Director of the United States Patent and Trademark Office*